Oct. 17, 1967 W. E. FOLKERTS 3,346,937
METHOD OF MAKING AND ASSEMBLING STEERING GEAR PARTS
Original Filed March 30, 1964 2 Sheets-Sheet 1
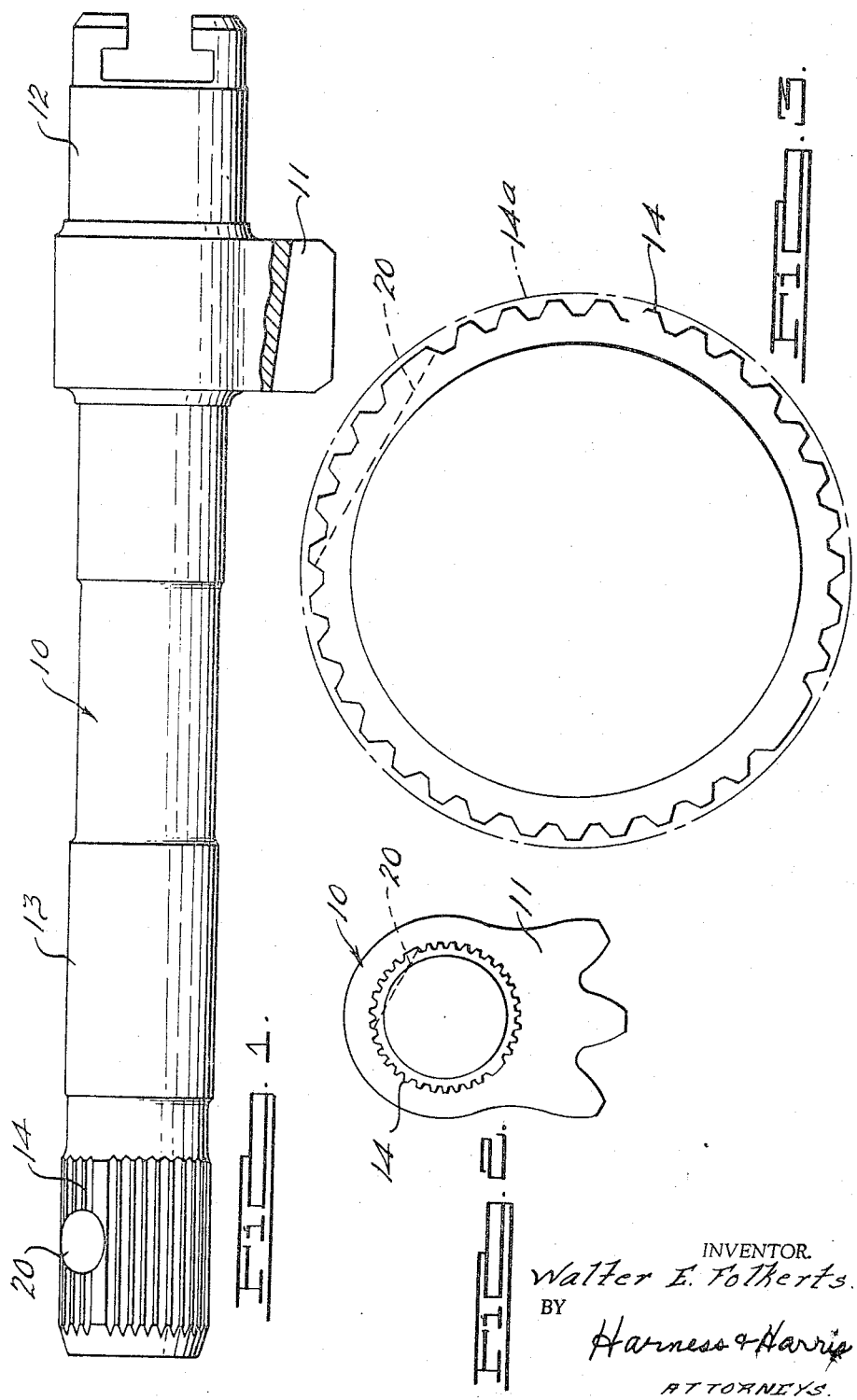
INVENTOR.
Walter E. Folkerts.
BY
Harness & Harris
ATTORNEYS.

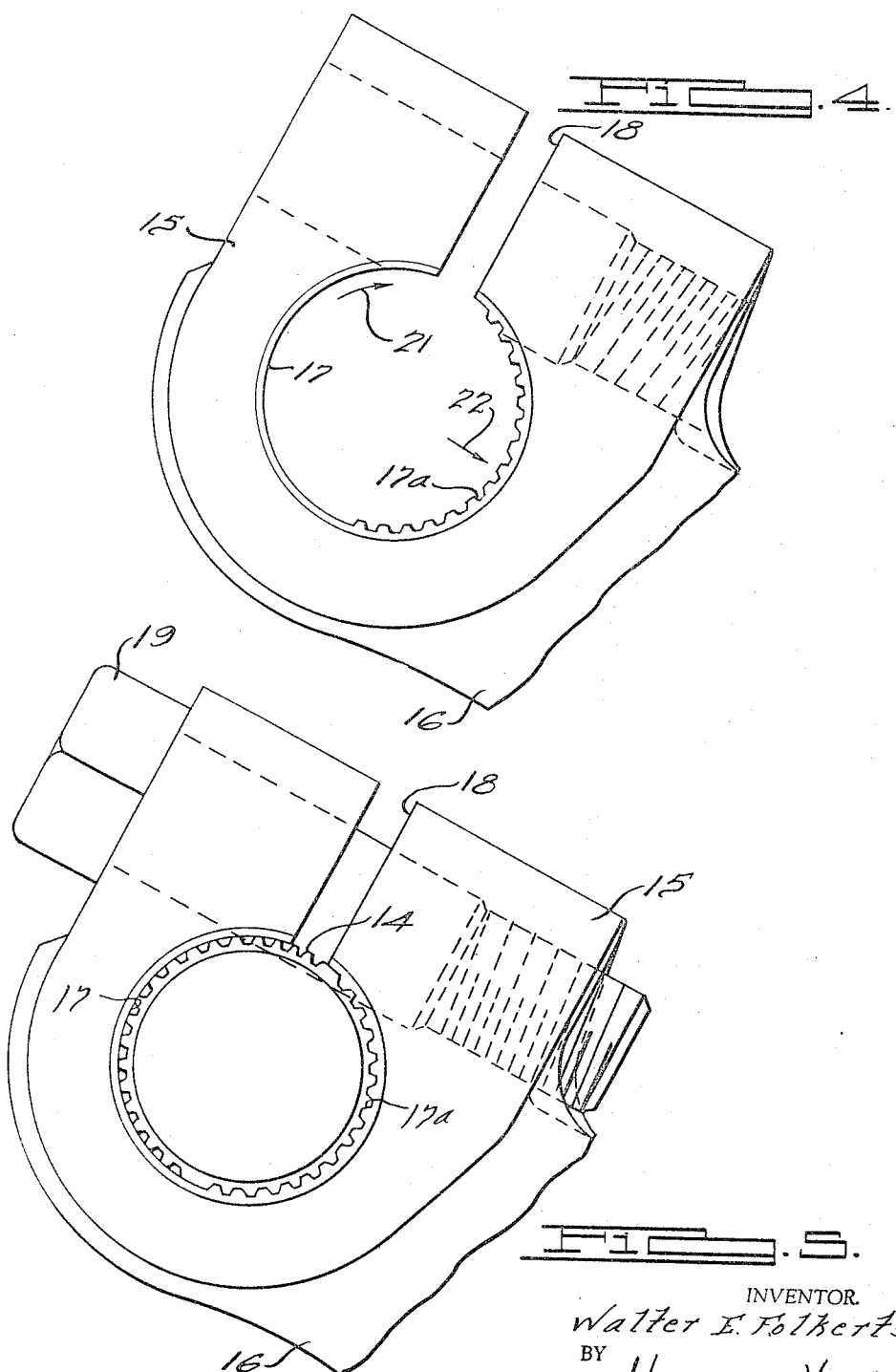

3,346,937
METHOD OF MAKING AND ASSEMBLING STEERING GEAR PARTS
Walter E. Folkerts, Hazel Park, Mich., assignor to Chrysler Corporation, Highland Park, Mich., a corporation of Delaware
Original application Mar. 30, 1964, Ser. No. 355,682, now Patent No. 3,285,638, dated Nov. 15, 1966. Divided and this application May 16, 1966, Ser. No. 550,536
3 Claims. (Cl. 29—159.2)

This invention relates to an improved method of making a spline shaft and hub, the shaft and hub being adapted for use in an automobile steering gear where play in the assembly is especially objectionable, and comprises a division of applicant's copending application Ser. No. 355,682, filed Mar. 30, 1964, now Patent No. 3,285,638, granted Nov. 15, 1966.

Important objects of the present invention are to provide an improved spline connection between a shaft and a hub which is characterized by increased strength and less play in the assembly as compared to comparable construction, and to an improved method for making such an assembly.

In a customary type of automobile steering gear, a manually or power actuated rock shaft is splined at one end and connected to a correspondingly splined hub of a pitman, which in turn is connected with the steering linkage to actuate the same. The spline connection usually comprises a plurality of exterior spline teeth or serrations extending axially on the rock shaft and mating with a corresponding plurality of interior spline teeth or serrations in the hub. In order to completely avoid play or looseness in the spline connection, the mating spline teeth or serrations are tapered axially and the hub is wedged axially along the rock shaft until an absolutely tight fit is obtained.

In such a construction, slight variations in the angle of taper and in the dimensions of the tapered spline teeth will result in an appreciable variation in the resultant axial location of the pitman hub on the rock shaft whereat play therebetween is avoided. As a further consequence of the geometry of the steering linkage, variations in the position of the pitman on the rock shaft seriously interferes with the desired steering action and often results in objectionable road feed back through the steering linkage and gear to the vehicle operator.

It is accordingly a further object of the invention to provide an improved spline connection and method of making the same for an automobile steering gear, whereby a positive, snug interconnection between the pitman hub and rock shaft is obtained without recourse to tapered spline teeth, and whereby the axial location of the pitman hub with respect to the rock shaft is accurately predetermined.

Another object is to provide improved method of forming a spline and bearing surface for the rock shaft of a vehicle steering mechanism and for assembling the same with a splined hub.

Other objects of this invention will appear in the following description and appended claims, reference being had to the accompanying drawings forming a part of this specification wherein like reference characters designate corresponding parts in the several views.

FIGURE 1 is an elevational view of a steering gear rock shaft embodying the present invention.

FIGURE 2 is a left end view of the shaft of FIGURE 1.

FIGURE 3 is an end view of the spline portion of FIGURE 1 after the spline has been rolled into the shaft and prior to being ground to size.

FIGURE 4 is a fragmentary elevational view of a pitman and hub adapted to be splined onto the shaft of FIGURE 1.

FIGURE 5 is a view similar to FIGURE 4, showing the hub of FIGURE 4 splined onto the shaft of FIGURE 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the present invention adapted for use in a vehicle power steering gear is illustrated by way of example comprising a forged rock shaft 10 having an integral sector gear 11 spacing cylindrical coaxial bearing surfaces 12 and 13 and a splined end 14. The latter comprises a plurality of circumferentially spaced teeth or serrations extending axially in the surface of the shaft 10.

A separate hub 15 having an integral pitman arm 16 and a central bore 17 is adapted to be assembled with the shaft 10 as described below. The outer swing end of the pitman 16 is adapted for connection with the vehicle steering linkage. The hub 15 is also provided with a slot 18 opening into the bore 17, the hub being bored at opposite sides of the slot 18 and tapped at one side for a screw threaded bolt 19. The bore for bolt 19 slightly intersects the bore 17 so that a corresponding groove 20 is formed in the serrate portion 14.

The major portion of the bore 17 is smooth and of the same diameter as the serrate portion 14 except for operational clearance to facilitate assembly. A portion of the half of the bore 17 measured from one side of the slot 18 is serrated at 17a to mate with the serrations 14.

In construction of the device shown, the shaft 10 with sector gear 11 and bearing 12 may be forged and machined to size by conventional methods. Comparatively smooth cylindrical portions will also be provided on shaft 10 to be subsequently formed into the bearing 13 and splined end 14. The serrations for the end 14 are then rolled into the shaft 10 entirely around its circumference, whereby the outer diameter of the serrate portion will be enlarged somewhat as indicated by the dotted line 14a, which marks the outer periphery of the rolled serrations. Although only a portion of the serrate portion 14 will interfit with the serrations 17a, it is easier and more economical to roll the serrations 14a entirely around the circumference of the shaft 10, rather than partially around.

After the rolling operation, the serrations 14a together with the enlarged cylindrical surface provided for bearing 13 are ground to the same final diameter indicated by the solid view FIGURE 3. Thus each of the serrations 14 will comprise a truncated triangle having an outer radius equal to the radius of bearing surface 13, and approximately equal to the radius of bore 17, except for the aforesaid operational clearance to enable hub 15 to be slid axially onto the serrate portion 14 to the assembled position, FIGURE 5.

The grinding operation serves two purposes. First it enables a cylindrical bearing to be sleeved over the serrate portion 14 onto the bearing portion 13 thereby to facilitate assembly of the shaft 10 with other portions of the steering gear. Secondly, the grinding operation assures an accurate outer diameter for the serrate portion 14, which minimizes bending stresses in the hub 15, when the latter is assembled with the splined portion 14 and the two sides of slot 18 are clamped tightly toward each other by tightening of the bolt 19.

The slot 20 and gear teeth of sector gear 11 are formed and finished in accordance with conventional practice. Likewise the hub 15 and arm 16, as well as the slot 18 and bore for bolt 19, are formed conventionally. The smooth portion of bore 17 and the serrate portion 17a are suitably formed in a single operation, as for example by broaching. It is too difficult to support a roller within the small diameter of the bore of hub 15, so that the serrate portion 17a cannot be feasibly formed by a rolling operation. Accordingly no additional expense is incurred by broaching the bore 17 with its serrate portion 17a to provide approximately half the circumference smooth and the remainder serrate.

It has been found that the construction described has considerably greater holding power and does not tend to work loose as readily as would be the case if the bore of hub 15 were provided with teeth around its entire periphery. This is true in part because when the hub bore is provided with teeth around its entire periphery, the accumulation of error in locating the teeth will result in only a few of the teeth assuming the entire load when interfitted with the teeth of splined portion 14. When the loaded teeth give way under load, looseness or play in the entire assembly results.

In addition, by the construction shown, when the bolt 19 is tightened, the smooth portion of bore 17 will be rolled clockwise in the direction of the arrow 21 and will be caused to slide along and in some cases actually imbed into the confronting teeth of the serrate portion 14. The toothed portion 17a at one side of the hub bore will thus be side loaded by force applied somewhat in the direction of the arrow 22 as the smooth portion of bore 17 is tightly clamped against the teeth 14. This side loading effect tends to distribute the force of the spline teeth 14 more uniformly over the toothed portion 17a. In consequence, the partially serrated portion of bore 17 will interfit more effectively with the serrations 14 to effect a more efficient spline connection between shaft 10 and hub 15 than has been possible heretofore.

I claim:

1. In the method of making a vehicle steering gear, the steps of forming a shaft; rolling a plurality of axially extending serrations into said shaft around the circumference of the latter; forming a pitman with a hub, an axial cylindrical hole through said hub for receiving said serrations snugly therein and comprising a serrate portion having axially extending serrations in the approximate one-half thereof measured circumferentially in one direction from a reference point and comprising a smooth portion of substantially uniform radius for the remainder thereof, and a slot extending radially through said hub into said hole at said reference point and also extending axially of said hole; assembling said shaft and pitman with the serrations of said hole interfitting with the serrations of said shaft; and drawing opposite sides of said slot together to lock said serartions together and cause the smooth portion of said hole to roll against the serrations of said shaft and bind the same.

2. In the method according to claim 1, including the step of machining the radially outer tips of the serrations of said shaft to a predetermined uniform radius substantially equal to the radius of said smooth portion.

3. In the method of claim 1, including the step of rolling said serrations of said shaft into the latter to provide a plurality of axially extending serrations arranged entirely around the circumference of said shaft and a shape for each of the latter serrations in the cross section perpendicular to the axis of said shaft having converging sides merging radially to an apex, machining the radially outer tips of said latter serrations and the axially juxtaposed portion of said shaft to a uniform radius substantially equal to the radius of said smooth portion to provide a bearing surface having said radius on said axially juxtaposed portion and to provide a shape for each of said latter serrations in said cross section having said converging sides truncated at said radius.

No references cited.

JOHN F. CAMPBELL, *Primary Examiner.*

THOMAS H. EAGER, *Examiner.*